United States Patent [19]
Donoho et al.

[11] Patent Number: 5,189,642
[45] Date of Patent: Feb. 23, 1993

[54] SEAFLOOR SEISMIC RECORDER

[75] Inventors: Paul L. Donoho, Houston, Tex.; Mitchell F. Peterson, Diamond Bar, Calif.; Hughie Ryder, Anaheim, Calif.; William H. Keeling, Chino, Calif.

[73] Assignee: Chevron Research and Technology Company, San Francisco, Calif.

[21] Appl. No.: 757,155

[22] Filed: Sep. 10, 1991

[51] Int. Cl.$^5$ .............................................. G01V 1/38
[52] U.S. Cl. ..................................... 367/15; 367/173; 367/188; 181/122
[58] Field of Search .................... 367/4, 15, 16, 131, 367/141, 173, 188; 181/122, 401, 402

[56] References Cited

U.S. PATENT DOCUMENTS

| | | | |
|---|---|---|---|
| 4,138,658 | 2/1979 | Avedik et al. | 181/122 |
| 4,462,094 | 7/1984 | Bowden et al. | 367/188 |
| 4,692,906 | 9/1987 | Neeley | 367/15 |
| 4,951,264 | 8/1990 | Yamamoto | 367/15 |

OTHER PUBLICATIONS

Herber et al., "Bollettino di Geofisica", vol. 23, 90-91, 1981, pp. 233-242.
Byrne, "Marine Geophysical Researches", vol. 5, No. 4, 1983, pp. 437-449.
Sutton & Duennebier, "Optimum Design of Ocean Bottom Seismometers"-Marine Geophysical Researches, vol. 9, 1987, pp. 47-65.
Nakamura et al., "Geophysics", vol. 52, No. 12, 1987, pp. 1601-1611.
Sutton et al., "Lopez Island Ocean Bottom Seismometer Intercomparison Experiment", HIG-80-4-Hawaii Institute of Geophysics, Honolulu, 272pp (1980).
G. H. Sutton, et al., "An Overview and General Results of the Lopez Island OBS Experiment", Hawaii Institute of Geophysics Honolulu, pp. 3-34.

Primary Examiner—Ian J. Lobo
Attorney, Agent, or Firm—W. K. Turner; M. W. Carson

[57] ABSTRACT

A method and apparatus for recording acoustical and seismic signals at the ocean bottom with minimal noise. A seafloor seismic recorder couples geophones to the water bottom, stores the seismic data, and is retrievable. The device is comprised of a chassis, a ballast ring, an electronics control package, a geophone package, a buoy means, and a leg extension means. The geophone package is disconnectably connected to the portion of the control package housing, so that the geophone package can remain coupled to the seafloor, when the control package and chassis rise toward the surface for a short distance. The buoy means permits the ballast ring and geophone package to become embedded in the sediment upon impact, and allows the chassis, geophone package, and control package to rise to the surface upon release of the ballast ring. Leg members can be partially extended to cause the chassis and control package to rise toward the surface for a short distance, to isolate the geophone package from the control package and chassis during recording operations.

20 Claims, 6 Drawing Sheets

FIG_1

FIG_2

FIG_3a

TAPE STORAGE

1. DIGITAL CARTRIDGE TAPE
2. 150 MBYTE INITIAL CAPACITY – 320 MBYTE WITHIN 6 MO.
3. DATA COMPRESSION TO INCREASE CAPACITY
4. FUTURE UPGRADE TO DAT (1.3 GBYTE) OR EXABYTE (2.3 GBYTE) TECHNOLOGY

SYSTEM CONTROLLER

1. IBM-PC-COMPATIBLE COMPUTER CONTROLS ALL SYSTEM FUNCTIONS
2. FAULT DIAGNOSIS AND CORRECTION CAPABILITY
3. EXTERNAL HIGH-SPEED DATA RETRIEVAL
4. INTERACTIVE I/O VIA RS232 AND ACOUSTIC CHANNELS

RECOVERY SUBSYSTEM

1. ACOUSTIC 2-WAY COMMAND AND STATUS CHANNEL
2. STROBE LIGHT AND RADIO BEACON FOR RECOVERY IN ALL SEA STATES, DAY OR NIGHT
3. FAIL-SAFE TECHNIQUES TO FACILITATE RECOVERY ON SERIOUS SYSTEM FAILURE

FIG_3b

FIG_4

FIG_5

FIG_6

SEAFLOOR SEISMIC RECORDER

FIELD OF THE INVENTION

The present invention relates generally to recording seismic data. More specifically, this invention provides a seafloor seismic recorder which couples geophones to the water bottom, stores the seismic data, and is retrievable, while minimizing the effects of noise due to water movement.

BACKGROUND OF THE INVENTION

Instruments for recording acoustical and seismic signals at the ocean floor have been in use for many years. The traditional use for these devices was in the field of earthquake monitoring. The earthquake devices are concerned primarily with first arrival time of the seismic wave, rather than any component characteristics of the seismic wave. These devices are typically refereed to as "OBSs", i.e., Ocean Bottom Seismometers.

The measuring and recording of seismic signals is of particular concern in oil exploration geophysics and petroleum reservoir development research. For these uses, full wave information is desired, i.e., both the horizontal and vertical components of shear waves and the compressional wave information need to be recorded separately. Prior art has centered on three main groups of apparatus to measure seismic signals on the seafloor. The first type is a cable that contains geophones, which is laid on the ocean floor. This has not worked well, since the cable and geophones are not rigidly coupled to the sediment on the ocean floor, and thus horizontal motion other than that due to the sediment can cause erroneous signals. Even if a large array of sensors per channel is employed, poor sediment coupling leads to poor data. In addition, a two-ship operation will be required, as a specially equipped vessel is necessary for cable deployment in addition to a source vessel.

A second type of recording method is a hydrophone that is anchored to the sea floor. The device digitizes the signals and then transmits them to the surface (a recording vessel). Only one sensor per channel is available, thus no noise-cancelling arrays are possible. There is also no shear-wave detection capability. The method is also very expensive (approximately 10 times a conventional survey cost, and radio interference may preclude its use in some areas.

The largest drawback to anchored hydrophones, however, is the severe depth limitation (about 70 feet). Modern offshore petroleum exploration frequently requires working at depths of 5,000 feet and more.

The third type of seismic recording device is known as Seafloor Seismic Recorders (SSR's). These devices contain the geophones in a sealed package, and record a signal on the seafloor. Data is retrieved by retrieving the apparatus from the seafloor. A retrievable device is re-usable in theory, and is thus extremely cost effective, as they cost over $20,000. SSR's allow 3-component geophone recording, in addition to special configurations using accelerometers or other sensing devices. Excellent coupling to the sediment is achievable with the present invention, due to its novel design. There is also no depth limitation. Prior SSR's have been used in water up to 3,000 meters deep. Prior art SSR's have been hindered by both unreliable retrieving methods and fidelity of data collection. Data collection quality has been reviewed by G. W. Sutton et al., "Lopez Island Ocean Bottom Seismometer Intercomparison Experiment", HIG-80-4, Hawaii Inst. Geophys., Honolulu, 272 pp. (1980) and G. H. Sutton et al., "An Overview and Results of the Lopez Island OBS Experiment", Marine Geophys. Res. Vol. 5, pp. 3-34 (1981).

Data quality is influenced by noise produced by wave motion acting on the apparatus, along with other undesirable energy inputs, imperfect coupling of the geophones to the ocean bottom, limited dynamic range of the apparatus, limited data storage capacity, and overall unreliability. In trying to solve one problem, the solution often exacerbates another problem. For example, one solution to the problem of recovery is to tether the apparatus to a surface ship or buoy. Unfortunately, the action of ocean currents on the tether and waves and wind on the ship or buoy impart large amounts of energy to the geophones, giving poor results.

Four U.S. patents have been assigned to Mobil Oil Corporation. U.S. Pat. No. 4,441,537 discloses an electronic system which releases an on-bottom seismometer, for subsequent recovery. U.S. Pat. No. 4,666,338 discloses an apparatus for retrieving an ocean bottom seismometer, using inflatable flexible housings. U.S. Pat. No. 4,780,863 discloses an apparatus for supplying the power requirements of an ocean bottom seismometer. U.S. Pat. No. 4,692,906 discloses an ocean bottom seismometer that is weighted at the bottom, and has a seawater ballast which may be ejected to provide positive buoyancy for retrieval.

None of the four patents referenced above even attempts to solve the problem of noise that is produced by wave or current motion and the problem of imperfect coupling of the geophones to the ocean bottom. Seismic data results from two components of the seismic signal, a horizontal and a vertical. The horizontal component is usually much fainter than the vertical. When forces other than from seismic vibration act on the geophone, a phenomenon known at "cross coupling" occurs. Specifically, horizontal signals not the result of seismic energy but instead from extraneous sources act to mask the true seismic horizontal signal. This can result in horizontal signals which look like vertical signals. Additionally, noise can mask the first arrival point of the seismic wave. The extraneous energy causing these problems can be imparted to the geophones by at least two major contributors. First, if the geophone mountings are solidly connected to a seismic seafloor recorder chassis, even by a hinged linkage, any forces which act on the chassis will be imparted to some degree to the geophones. The forces which act on the chassis can vary from ocean current forces to the seismic vibrations from the seismic source itself. Second, ocean currents can act directly on the geophone housing. Additionally, if the geophones are not firmly affixed to the ocean floor, horizontal forces will cause friction (and thus signals) between the geophone package and the seafloor. There currently exists no design of a SSR that directly addresses and solves these problems.

An apparatus attempting to accomplish the objectives of this invention was disclosed by Byrne, et al. in "Marine Geophysical Researches" Vol. 5, No. 4, pp. 437-449 (1983). Byrne et al. attempt to achieve minimization of energy input resulting from currents acting on the chassis of the OBS (as they called it) by detaching the geophones from the chassis, except for two small cables. This did not completely solve the problem, as coupling with the ocean floor did not occur, and the geophone assembly was left laying loosely on the ocean floor (as opposed to being coupled to the sediment of the ocean floor), and thus was subject to currents on the ocean floor. Byrne did propose a method to increase contact between the ocean floor and the geophones by placing the geophones in a flexible bag weighted with pellets. This would certainly improve the physical contact between the geophones and the ocean floor, but there are still problems: 1) The bag still lays on the floor and has a profile above the floor, and is thus subject to currents; 2) the coupling is better, but not direct, and any junctions between the seafloor and the geophones will degrade signal quality; and 3) Byrne does not suggest how this additional bulky bag would be deployed, and how it might affect recovery of the OBS.

Another method that is known in the art and attempts to couple the geophones to the sediment has involved the use of spikes. In this method, the geophone was mounted on a heavily (100-200 kg) weighted spike and dropped in the water. The mass was sufficient to drive the geophone into the sediment. Unfortunately, these devices suffer from mass resonance effects. That is, the seismic wave moves the whole mass which vibrates, imparting energy to the geophones, creating erroneous signals.

An ocean bottom seismometer was disclosed by Herber et al. in "Bollettino di Geofisica" Vol. 23, N. 90-91, pp. 233-242 (1981). The system is connected to a surface buoy via a polypropylene line. However, the geophones are not coupled to the sediment adequately to provide the needed data resolution. Because of the cable (line) and the fact that the geophones are attached to the main body, the apparatus is subject to the ocean currents and waves, therefor causing undesirable noise.

Sutton and Duennebier published an article entitled "Optimum Design of Ocean Bottom Seismometers" in Marine Geophysical Researchers, Vol. 9, pp. 47-65 (1987). Experiments indicated that OBS packages should be designed with (1) the minimum mass possible, (2) radius of area in contact with the sediment proportional to the cube root of the mass, and the maximum radius less than $\frac{1}{4}$ of the shear wavelength, (3) density of the OBS approximately that of the sediment, (4) a low profile and a small vertical cross section with water, and (5) low density gradients, and a maximum symmetry about the vertical axis. Sutton and Duennebier, however, do not disclose any attempt to actually design an apparatus which solves the problems of insufficient coupling, the effect of ocean currents on the main body, and maintaining recoverability.

Nakamura et al. (including Applicant Donoho) describe an ocean bottom seismograph that was developed at the University of Texas, in "Geophysics, Vol. 52, N. 12, pp. 1601-1611. The device records 3-component data, however, the geophones are not adequately coupled to the sediment. Also, ocean currents act on the main body, which causes undesirable noise and a decrease in data quality. The dynamic mass of the apparatus, as described by Sutton and Duennebier, supra on p. 51 and at FIG. 5 affects the quality of the data as well. In addition, as the recording device is coupled to the geophones, a temporary data storage means is needed.

The prior work is limited in the attempts at recording seismic data useful in petroleum exploration, in relatively deep water, from geophones coupled to the sediment for the reasons set forth above. There is, therefore, a need for an accurate, reliable, code retrievable device that record such seismic data.

SUMMARY OF THE INVENTION

The present invention is surprisingly successful in providing a method and apparatus for recording seismic data using a seafloor seismic recorder that is released into a body of water at a location to be seismically surveyed. It is especially useful in geophysical exploration for oil and gas at locations having deep water depths. The apparatus is relatively inexpensive and permits geophones implanted on the seafloor to be nearly free from the effects of wave action and currents.

A seafloor seismic recorder is comprised of a chassis, a ballast ring, and a geophone package. The chassis has an upper end plate and at least two rigid leg members which have top ends and bottom ends that extend downward from the end plate. The ballast ring is disconnectably connected to the bottom ends of the leg members.

The contract package is comprised of a housing and various electronics means, and has an upper portion and a lower portion, and is fixedly connected to the chassis at a position between the leg members and below the upper end plate.

The geophone package is disconnectably connected to the lower portion of the control package housing by a clamp means, and is electrically connected as well. It is tethered to the housing by a tether means that will absorb tension caused by detaching the leg members from the ballast ring. The geophone chassis package has at least one biased, gimbal mounted geophone that is biased to come to rest in a nearly horizontal position.

A buoy means such as a syntactic foam is attached to the chassis upper end plate to maintain the upper end plate nearly vertically above the ballast ring when the seafloor seismic recorder is released into a body of water, and to permit the ballast ring and geophone package to become embedded in the sediment upon impact such that sufficient coupling is achieved. The buoy means also permits the chassis, geophone package, and control package to rise to the surface upon the release of the ballast ring from the leg members.

A leg extension means, leg claim means, and leg stop means permit the leg members to be partially extended to cause the chassis and control package to rise toward the surface for a short distance, to thereby isolate the geophone package from the housing when detached from the housing, yet remain sufficiently coupled to the sediment.

The geophone package may be filled with a fluid to dampen the geophone motion, to isolate the geophones from external vibrations, and to help prevent damage to the geophones. The above and other embodiments, objects, advantages, and features of the invention will become more readily apparent from the following detailed description of the invention, which is provided in connection with the accompanying drawings.

DETAILED DESCRIPTION OF THE INVENTION

In accordance with the present invention, a new improved method and apparatus for a retrievable seafloor seismic recorder has been developed, that is useful in recording seismic data with geophones that are coupled to the sediment.

Figure 1:
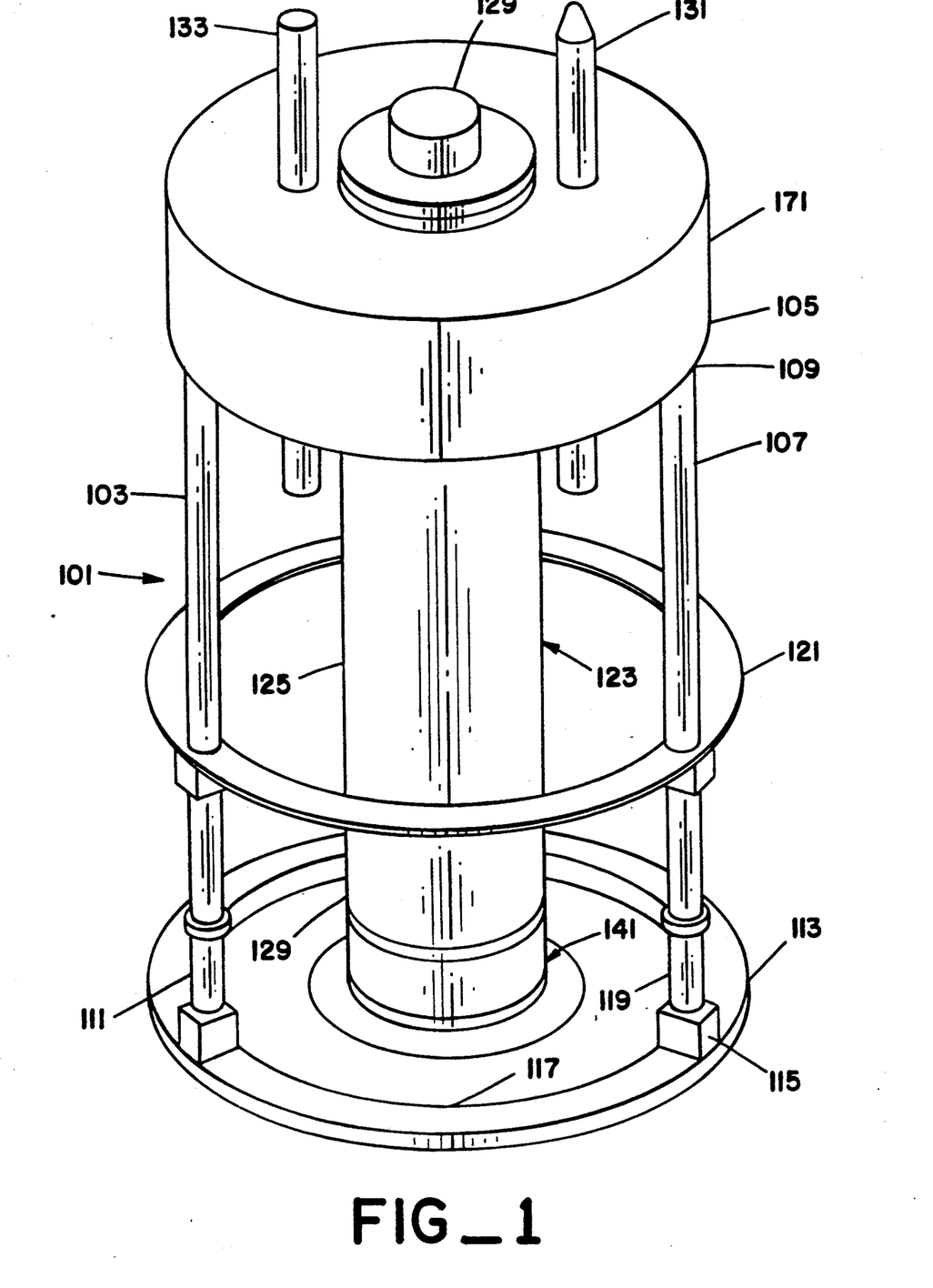
FIG. 1 shows a side and top view of the inventive seafloor seismic recorder.

Referring to the drawings, a first embodiment of the inventive seafloor seismic recorder 101 is shown in FIG. 1, as it would appear if sitting on the seafloor. Chassis 103 provides support, and is comprised of an upper end plate 105, and at least two rigid leg members 107, each leg member having a top end 109 and a bottom end 111. It has been found that the leg members that are comprised of thin-walled aluminum tubing are particularly effective, as they add minimum weight while providing adequate support to the device 101. In the preferred embodiment, three leg members 107 are incorporated, for ease of design.

Ballast ring 113 is disconnectably connected to the bottom ends 111 of the rigid leg members 107, and provides sufficient mass to cause the device 101 to sink to the bottom with enough momentum to ensure sufficient geophone coupling, and to keep the apparatus 101 in its proper orientation. The ballast ring 113 is preferably a flat disk of steel. Its weight is determined by final buoyancy requirements, but a maximum weight of 20 kg is required, (in water) as it must meet U.S. government requirements for objects left on the floor of the outer continental shelf. It is desirable that the ballast ring 113 be of ringed shape so that a geophone package, located near the center of the ring can easily become coupled to the sediment.

One effective means to disconnectably connect the ballast ring 113 to the bottom ends 111 of the rigid leg members 107 is by using leg clamps 115, which can be spring loaded to disconnect the ballast ring 113 from the leg members 107, when released.

A circuit can be activated, by a timing means or a remote activation means (not shown), to initiate the release of the leg clamps 115. Any of several means can be used for this remote release of the clamps, such as the following (not shown): Prior to the time to be released, the clamps 115 are held in place by a bungee cord stretched tight around their circumference. A line in the bungee cord is spliced in a short piece by exposed metal wire. The wire is electrically connected to a circuit which is activated at the time the ballast 113 is to be released (either by remote signal from the surface or by a timer on board the SSR). Once the electrical current starts flowing in the wire, the reaction with sea water causes the wire to corrode. Eventually the wire weakens to the point where the tension from the bungee cord causes the wire to break, releasing the bungee cord, allowing the clamps to spring open and finally allowing the ballast to be released. The whole process takes about 10 minutes.

In the preferred embodiment, lower support ring 117 is fixedly attached to at least two extension legs 119 that extend upward from the lower support ring 117 and disconnectably fit inside the rigid leg members 107, which are tubular in this embodiment. Ballast ring 113 is now disconnectably connected to the lower support ring 117 by a clamping means similar to that described above, which can be released by a release means such as the bungee cord method described above. A middle support ring 121 is fixedly attached to the leg members 107, at a position that is between the upper end plate 105 and the bottom ends 111 of the rigid leg members 107, in a further embodiment, to provide additional support and stability.

Control package 123 houses various electronics and power means. The control package 123 is comprised of a sealed housing 125; having an upper portion 127 and a lower portion 129. The housing 125 is fixedly connected to the chassis 103 and is positioned between rigid leg members 107, and below the upper end plate 105.

Control package 123 houses electronics means which, among other purposes, serves to record the seismic signals, provide a power source for the recorder and other appurtences such as a recovery light and radio, and the geophones, serves as a control circuit and as timers for the SSR's activities, and a compass.

In the preferred embodiment, the control package housing 125 is comprised of aluminum. Aluminum 6061T6 is preferable, and aluminum 7075T6 is recommended if water depths greater than 4,000 m are encountered. In the preferred embodiment, the dimensions of the control package housing 125 of the working model are approximately 8.63 inches O.D., 7.63 inches I.D., and 31 inches long, although these dimensions may be altered as desired.

At the upper portion 127 of the housing 125, an acoustic transducer 129 facilitates subsequent recovery at the surface, in addition to receiving commands. A radio beacon 131 and a strobe light 133 also facilitate recovery, especially at night. The side wall of the housing 125 has a hydrophone connection means (not shown) and multi-pin connectors (not shown) to receive geophone signals and to activate various release mechanisms.

Figure 2:
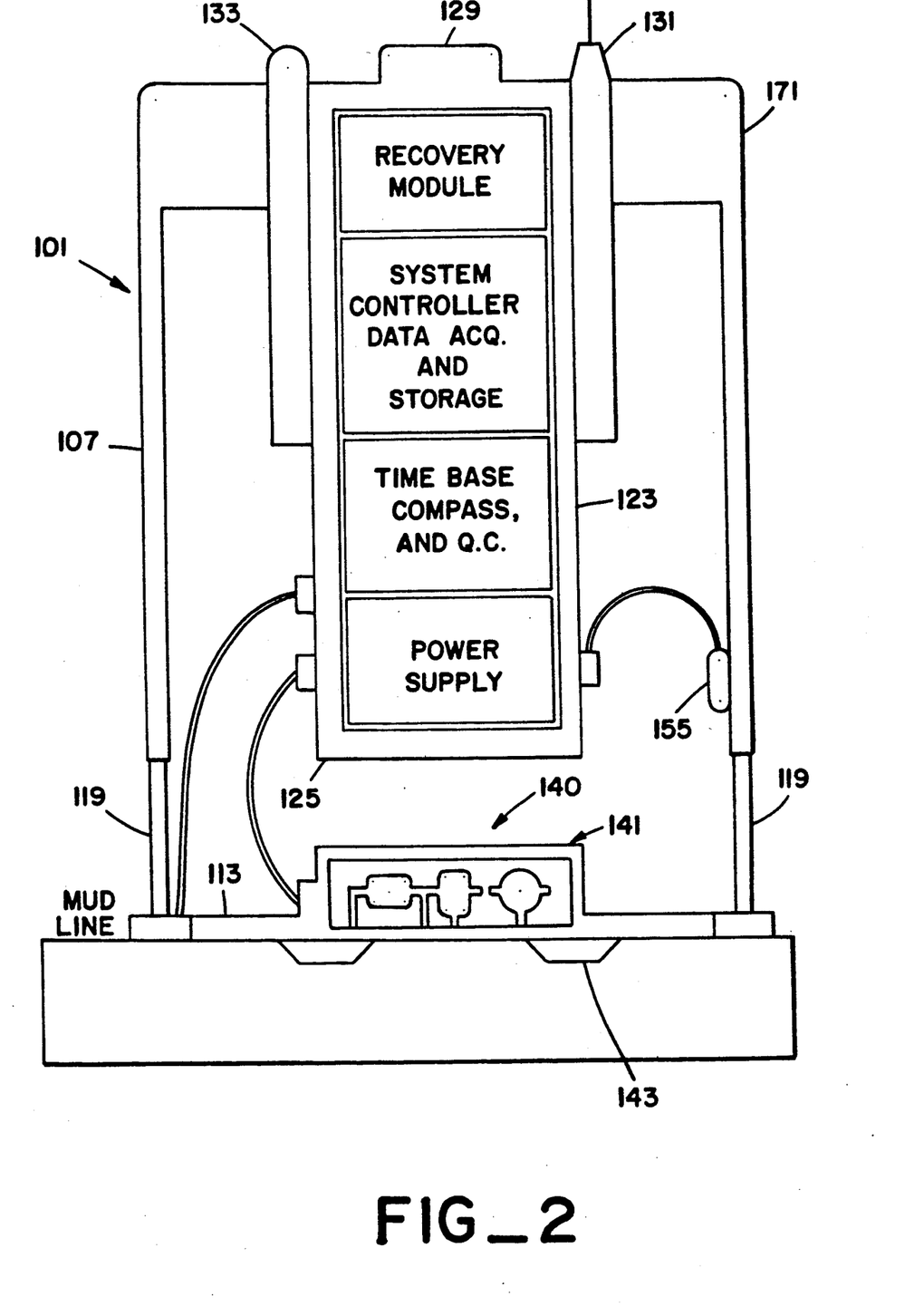
FIG. 2 shows a schematic, sectional view of the seafloor seismic recorder, as deployed during recording, which further illustrates the control package.

FIG. 2 shows a sectional view, not at true scale, of the seismic seafloor recorder 101 as deployed during recording, further illustrating the control package 123. The power supply may be of any type known in the art. For example, a non-rechargeable lithium battery pack is relatively easy to use and is reliable. A rechargeable battery pack would complicate the design, but is a viable alternative.

Acoustic transducer 129 may be any of several commercially available models. The transducer 129 communicates with a deck system on a deployment vessel via a two-way channel, permitting transmission of commands to the seafloor recorder 101 and receipt of status data from the recorder. The command/status capability will be used to recover the recorder at the end of a survey; to enable/disable recording as needed for systems already deployed on the seafloor; and to receive status information indicating possible problems from the recorder 101 after deployment. The transducer 129 also permits an extremely accurate determination of position on the seafloor.

The system controller comprises computer hardware and software, that is commercially available. For example, an IBM PC-compatible single board computer, having 768 kByte RAM, 40-Mbyte SCSI hard disk, SCSI port, two serial ports, a parallel port and an IBM PC expansion bus has been found to be suitable. Other useful features of the hardware include an SCSI external interface for high-speed data readout without opening a pressure case, and an interactive I/O while on a deployment vessel via an RS232 port. Interactive I/O while on the seafloor is possible via the acoustic transducer 129.

Suitable software may be an MS-DOS operating system that is compatible to the standard IBM PC software, with SCSI extensions. The applications programs are stored on a hard disk, which also serves as a large data buffer. Some real-time data analysis, such as noise analysis and first break readings are available. Interactive setup and checkout procedures are conducted with a full-screen external graphics monitor before deployment and after recovery of the seafloor seismic recorder 101.

Signal conditioning is enhanced through the use of a suitable preamp, a multiplexer, an IFP amplifier, and a digitizer, all of which are known in the art and are commercially available.

A recording system deployed on the seafloor, with no hard-wired communications link to a surface monitoring station, will normally be provided with an acoustic communications channel capable of fewer than 10 bits per second, transmission capacity. For such a system, essentially not in real-time contact with the seismic source vessel, it is necessary that the timing of events be recorded to an accuracy comparable to the data sample interval, typically 2 ms, or better, without access to any sort of absolute time standard.

Recorded seismic data is stored on a standard cartridge recorder of approximately 125-150 MByte capacity. A ¼ inch cartridge with SCSI interface capability has been found acceptable, such as a DC-600XTD. Cartridge capacity should be large enough to enable continuous recording at a 14 MByte/hr rate, with 4 channels, at a 2-ms sample rate. With data compression techniques, known in the industry, a 24-36 hour sampling duration is attainable. This recording duration covers most seismic survey situations, and permits the shooting of several lines recorded by a given seafloor seismic recorder 101. With either a programmed or an acoustically implemented on-off control of the seafloor seismic recorder, it can remain in place for much longer periods. Thus, problems that may occur on a seismic source vessel will not generally require recovery and redeployment of a group of seafloor seismic recorders.

Quality control, to ensure the electrical integrity of the seafloor seismic recorder, is also included in the inventive design. Calibration signals are applied to amplifier inputs, while the device is deployed on the seafloor to test noise levels, linearity, IFP exponent operation, and disk and tape integrity. A diagnostic program known in the art tests the integrity of the data path during operation. A mechanical shaker, known in the art, assesses the quality of geophone coupling. Quality control diagnostic messages are transmitted to the surface by a real time acoustic channel, on command, via the acoustic transducer. A magnetic compass provides horizontal geophone orientation.

Figure 3A:
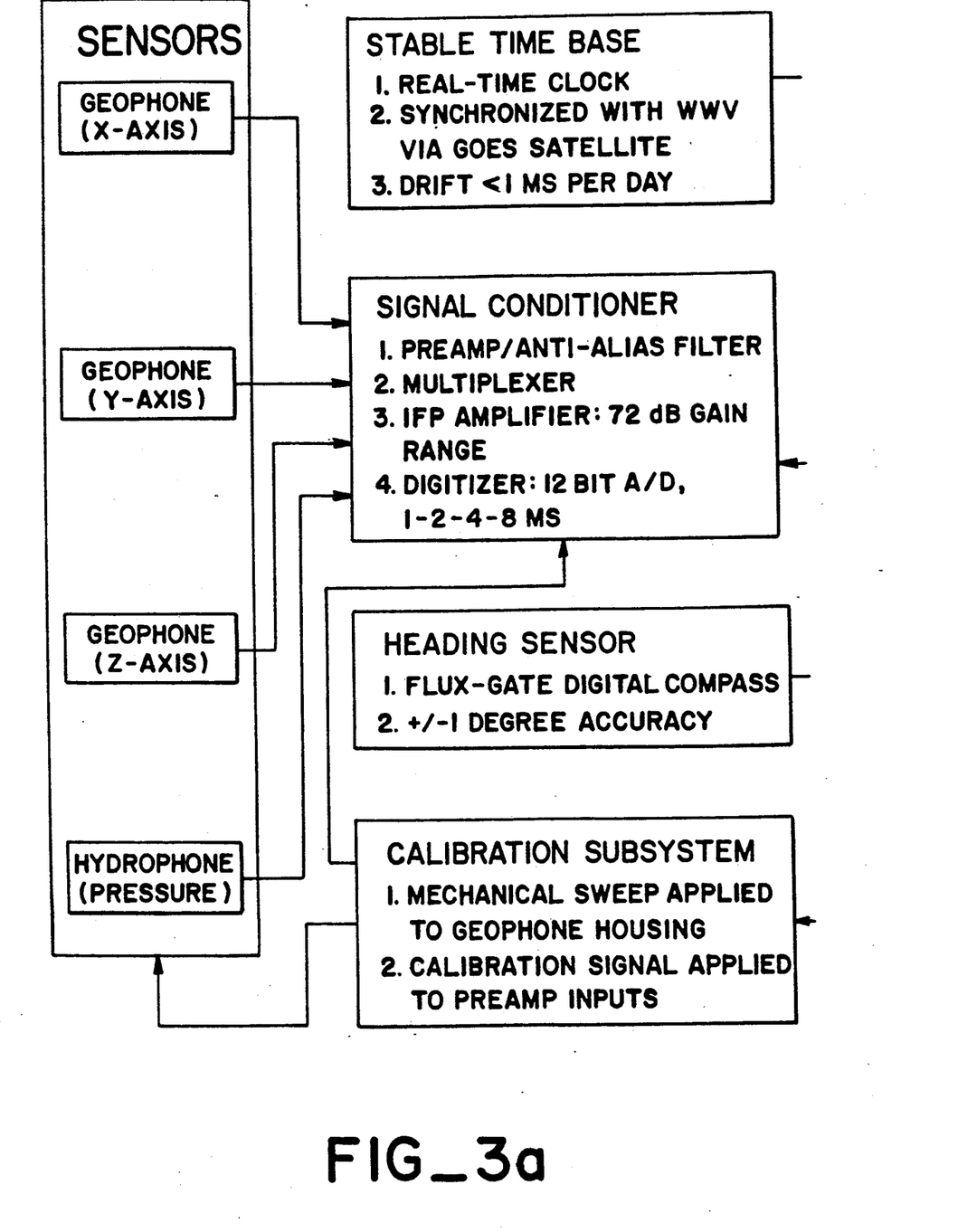
FIGS. 3A and 3B are a flow chart that illustrates how seismic data is recorded by the seafloor seismic recorder.
Figure 3B:
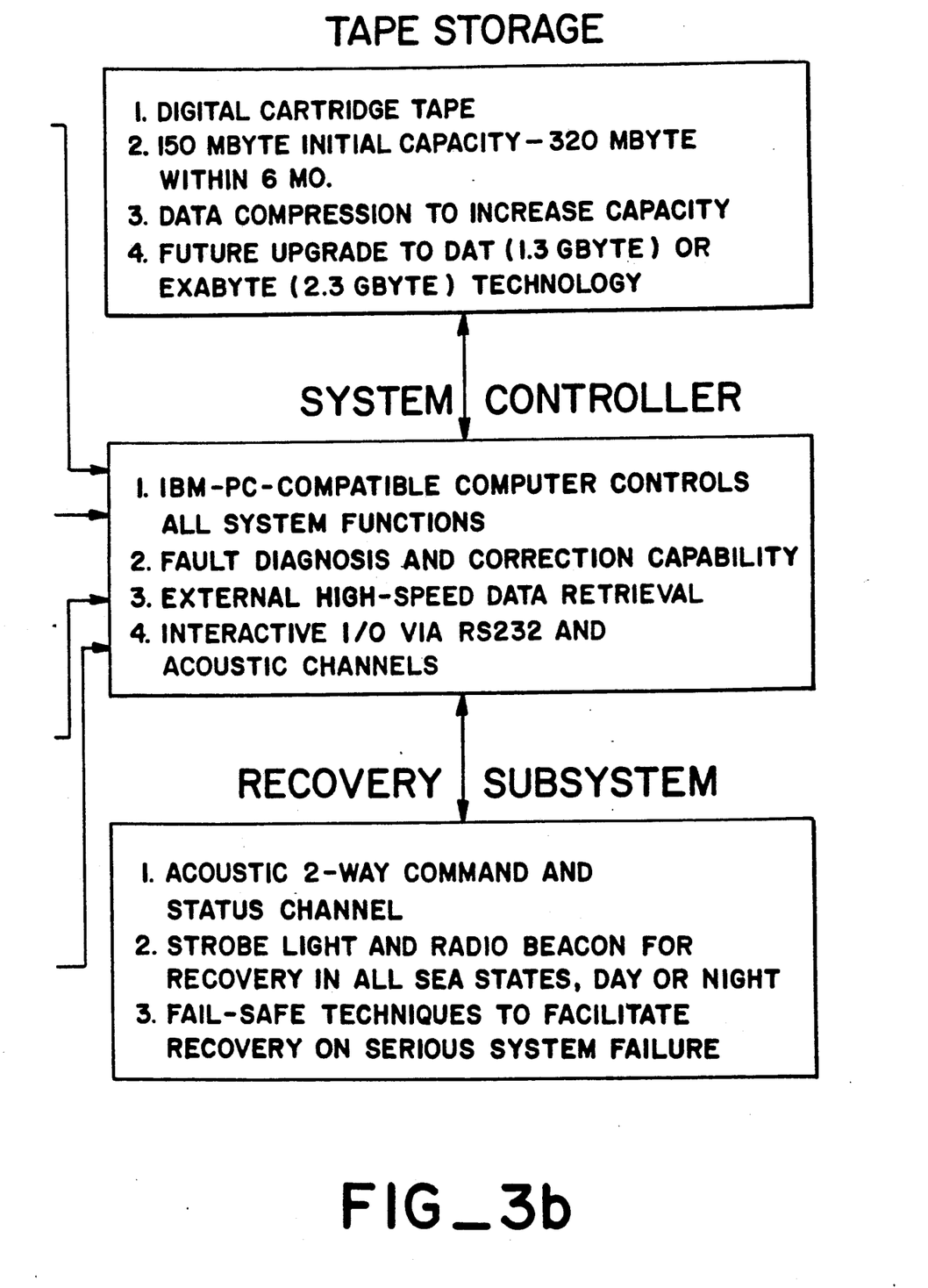
Figure 4:
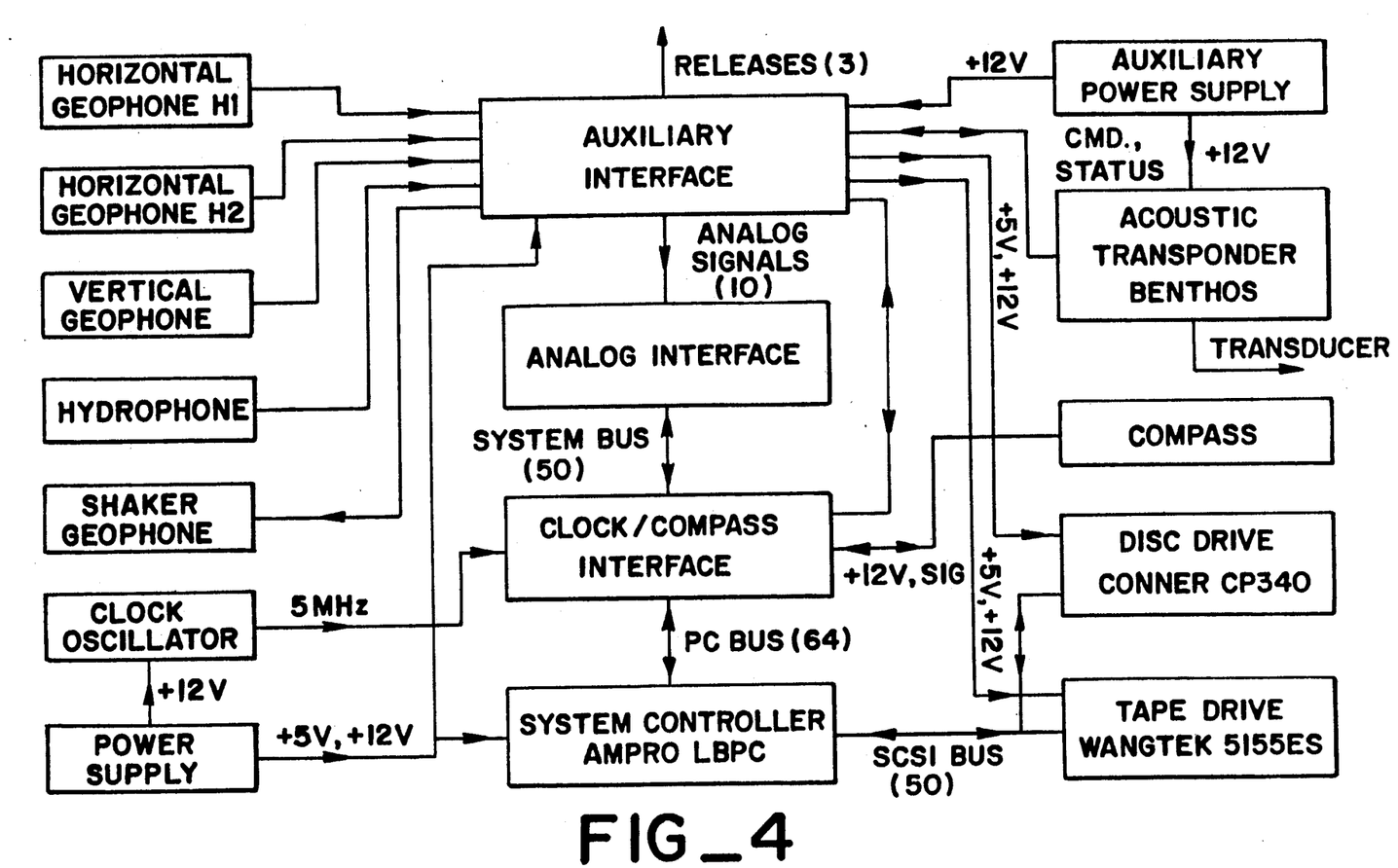
FIG. 4 is a flow chart that illustrates the electrical configuration of the seafloor seismic recorder.

FIGS. 3 and 4 are flow charts which further represent the electrical configuration of the inventive seafloor seismic recorder.

Figure 5:
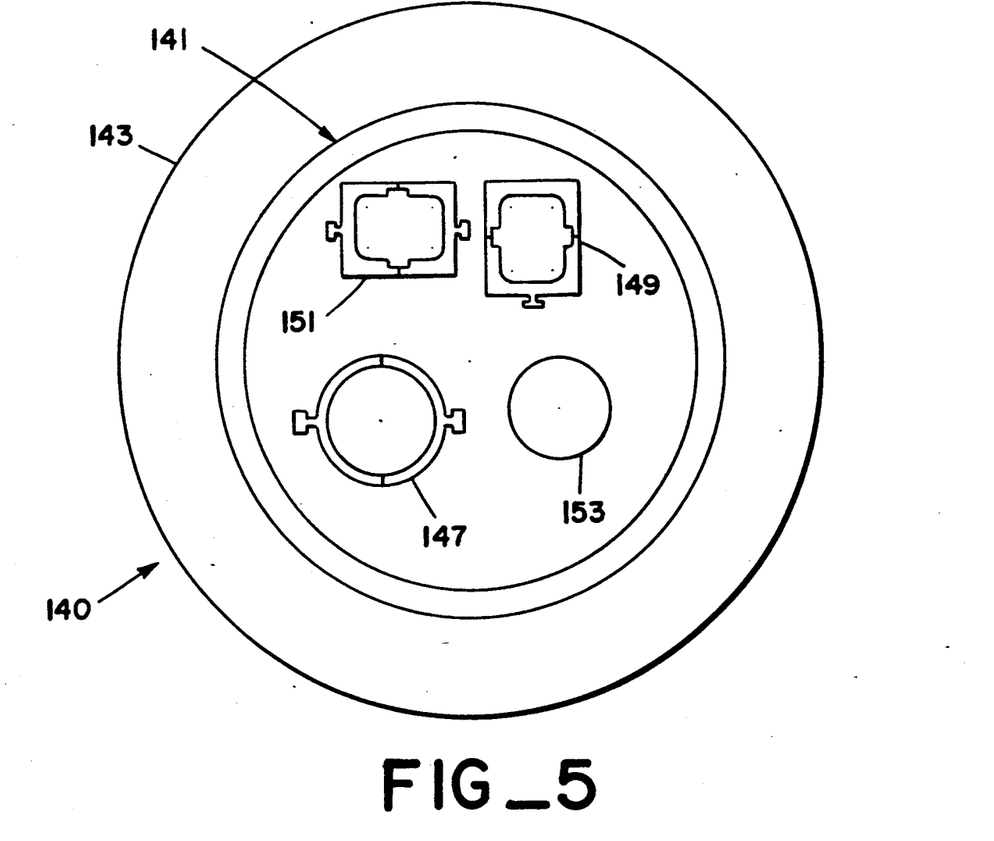
FIG. 5 is a top, sectional view of the geophone package.
Figure 6:
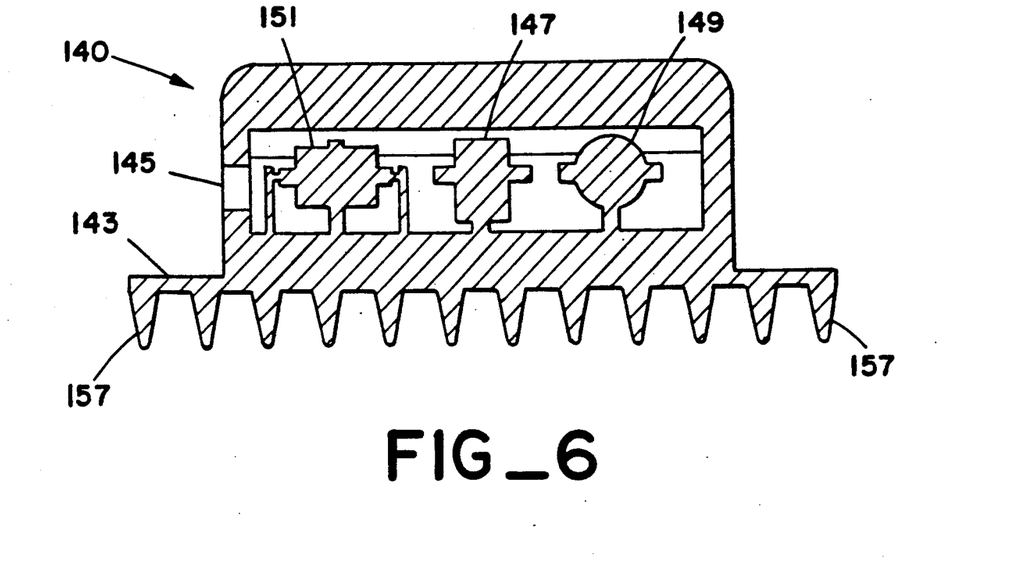
FIG. 6 is a side, sectional view of the geophone package.

FIGS. 5 and 6 show the geophone package 140, having a geophone housing 141. The inventive device incorporates at least one, and preferably three orthogonal geophones, commercially available, having resonant frequencies of 4.5 Hz or 8 Hz. In the preferred embodiment, 4.5 Hz geophones were utilized, and are rated at LRS L-1011 or equivalent. The geophone housing 141 is comprised of the same grade of aluminum as the control package housing 125, in the preferred embodiment (that is, grade 6061T6, or 7075T6 for water depths greater than 4,000 m). In the preferred embodiment, the geophone housing 141 is approximately 8.6 inches O.D. and 3.75 inches in length, not including coupling plate 143. Access port 145 provide a means for electrical connection to control package 123. An 8 pin connector is utilized in the preferred embodiment, to permit geophone signals and sweep input data to be transferred to control package 123.

A vertical geophone 147, a transverse geophone 149, and a radial geophone 151 are provided to record all types of induced motion. A fourth geophone 153 may be added to record swept mechanical vibration. It is desirable that the geophones be immersed in a viscous fluid, such as silicone damping fluid to ensure good coupling to the geophone housing 141, to prevent damage to the geophones, to dampen the motion of the geophones, and to reduce external vibrations. It is also desirable that the geophones be gimbal mounted, (bias mounted) to provide accurate vertical or horizontal orientation. Mechanical vibration swept over the seismic frequency range will be applied to the geophone housing 141, and coupling resonances will be detected. Ambient seafloor noise will provide indications of problems such as deployment on a rock outcrop or current-induced noise.

Hydrophone 155 is positioned outside the geophone housing 141, and is able to operate at all water depths. The hydrophone data is generally free of shear-wave events, and it can be used with the geophone data to help identify shear-wave arrivals, and for quality control. The hydrophone 155 has an internal preamp in the preferred embodiment. Its low frequency response should correspond to at least the geophone resonant frequency.

The geophones and the hydrophone should all be able to record at sample intervals of 1, 2, and 4 ms; have a dynamic range of 60 dB instantaneous floating point; have a digital resolution of 12-bit A/D converter (or 11 bits + sign); have an anti-alias filter of ½ Nyquist, at 60 dB/octave; have a low-cut filter of 4 Hz, at 18 dB/octave Butterworth; and provide less than 0.25 microvolt input electronic noise.

Another novel feature of the inventive seafloor seismic recorder 101 is its ability to obtain adequate coupling of the geophones to the seafloor. Coupling spikes 157, shown in FIG. 6, extend downward from coupling plate 143, so that when the seafloor seismic recorder 101 lands on the water bottom, sufficient coupling with the sediment occurs at the initial impact so that accurate geophysical data can be recorded, as per the specifications discussed above, and comparable to what would be considered good coupling on land.

The inventive seafloor seismic recorder 101 also solves the large problem of noise and cross-coupling due to water currents affecting the chassis 103 and control package 123. The geophone package 140 is disconnectably connected to the lower portion of the control package housing 125 by a geophone clamp means (not shown), which is similar to the leg clamps 115 described above. The geophone clamp means can be spring loaded to disconnect the geophone package 140 from the control package housing 125 when released. A release means, similar to the release means described above pertaining to the disconnection of the ballast ring 113 from the leg members 107, can be used. Therefore, shortly after impact upon the sediment, the geophone package 140 is released from the control package housing 125. The geophone package 140 is connected to the control package 123 by a tether means. By tether means we mean at least one line or cable that is flexible, and will absorb tension caused by detaching the leg members 107 from the ballast ring 113, or by detaching the lower support ring 117 from the ballast ring 113 in the preferred embodiment. In the preferred embodiment, the tether means is comprised of three cords which come into tension before tension is applied to the electrical connection means, (which connects the geophone package 140 to the control package 123), when the ballast ring 113 is disconnected, in either embodiment.

Next, the ballast ring 113 is disconnected from the bottom ends 111 of the rigid leg members 107. In the preferred embodiment, the ballast ring 113 is now disconnected from the lower support ring 117.

A buoy means 171, as shown in FIGS. 1 and 2, is attached to the upper end plate 105 to maintain the proper orientation of the seismic seafloor recorder; that is to keep the upper end plate nearly vertically above the base plate, while permitting the ballast ring 113 and the geophone package 140 to become embedded in sediment upon impact such that sufficient coupling between the geophone package 140 and the sediment is achieved. The buoy means also must permit the chassis 103, geophone package 140, and control package 123 to rise to the surface upon release of the ballast ring 113 from either the leg members 107, or if the preferred embodiment is utilized, the lower support ring 117. As shown in FIG. 1, the large amount of separation between the center of gravity and the center of buoyancy ensures stability and proper orientation.

In the preferred embodiment, the buoy means 171 is a syntactic foam, such as the standard blocks manufactured by Grace Syntactics. Buoyancy can be controlled by the amount of glass spheres used, and the size of the buoy means 171. The size of the glass spheres may limit the water depth allowable, as increasing water pressure will eventually crush the glass spheres, and buoyancy will be lost. Smaller glass spheres can be used for greater water depths, and more foam will be necessary. The amount of foam and the size and amount of glass spheres can be calculated by methods known in the art. The buoy means 171 should be painted with bright colors to aid in the recovery of the device after it reaches the surface.

The seafloor seismic recorder 101 is designed to have positive buoyancy if the ballast ring 113 is not attached, so that it can rise to the surface, pulling the geophone package 140 out of the sediment by the tether means. In the preferred embodiment, the seafloor seismic recorder 101 has a positive buoyancy of approximately 10 pounds, including the ballast ring 113. At the moment the ballast ring 113 is released, before the tether means slack is taken up, it has a positive buoyancy of about 15 pounds, which is sufficient to pull the geophone package 140 free of the sediment, and to cause the apparatus to rise to the surface even if the control package 123 fills with water. Automatic release of the ballast ring 113 can be activated in the event of a leak, or if the device remains inoperative for a certain length of time. Ballast ring 113 can be constructed wider, while maintaining the same mass, to prevent plugging of seismic seafloor recorder 101 in thick silt or clay.

After the seafloor seismic recorder 101 reaches the water bottom, the geophone package 140 is still connected to the control package 123, and thus to the chassis 103, as shown in FIG. 1. Water currents act on the apparatus, therefore causing inadequate coupling of the geophone package 140 to the sediment, as discussed above. To alleviate this problem, in one embodiment, leg extension means, leg clamp means and leg stop means (not shown) permit leg members 107 to be partially extended to cause the chassis 103 and control package 123 to rise toward the surface for a controlled, short distance, to isolate the geophone package 140 from the control package housing 125 after the geophone package 140 is disconnected from the lower portion of the control package housing 125 by the release of the geophone clamp means. The chassis and control package need only rise just enough to isolate the geophone package for the system to work, but a rise of a few inches is desirable to ensure complete isolation from the affects of water movement. The geophone package 140 is now still sufficiently coupled to the sediment to provide accurate seismic data recording, while remaining free of the effects of ocean currents on the remainder of the apparatus 101.

In the preferred embodiment, as shown in FIG. 2, a leg clamp means and a leg stop means (not shown) permit the extension legs 119 to restrictively extend away from the tubular leg members 107, due to the positive buoyancy, to cause the chassis 103 and the control package 123 to rise toward the surface for a short, controlled distance, after the geophone package 140 has been disconnected from the lower portion of the control package housing 125. After the seismic data has been recorded, the ballast ring 113 is released, and the apparatus rises to the surface for recovery.

The inventive seafloor seismic recorder can yield lithologic information in far greater detail than what could be obtained with conventional marine recording technology. Because the marine seismic source is located in the water, towed behind the recording vessel, it produces only primary (P)-waves. As a consequence, shear (S)-waves can be generated only in the earth by mode conversion at a solid-solid interface (or, perhaps, at the seafloor, although the velocity and density contrast for soft sediments will usually make seafloor conversion inefficient). The seismic signals which can be associated with shear-wave propagation in the earth must have undergone at least two conversions: P-S conversion, followed by propagation as an S-wave, then S-P conversion for subsequent hydrophone detection. In general, only a small fraction of the available source energy is converted to S-waves, and only a small fraction of the S-wave energy is re-converted to P-waves for detection. The hydrophone 155 is, therefore, relatively incapable of detecting shear-wave propagation effects in marine seismic surveys. The importance of S-wave detection for lithologic interpretation is well known in the art.

Four-channel (3 geophones and 1 hydrophone) data can be recorded, with excellent coupling to the seafloor, and a flat frequency response up to the normal range of seismic frequencies (typically ½ of the Nyquist frequency, or 125 Hz for a 2-ms sample rate. In addition, regular spaced arrays of seafloor seismic recorders can be established, in water depth far greater than current buoys can be deployed. Navigation technology permits its exact deployment location to be known within 15 feet, at all but the most extreme water depths.

Deployment of the seafloor seismic recorder 101 can be in conjunction with an operating conventional seismic contracting crew, and the same commercial navigation service could be used. It is desirable to install a time-break logger capable of recording air-gun breaks to an accuracy of 1 ms, referred to the GOES satellite time standard, on the seismic source vessel. No further interaction with the seismic contractor is needed. The cost per channel of the system is comparable to currently existing marine telemetry systems or other specialized recording systems.

While a preferred embodiment of the invention has been described and illustrated, it should be apparent that many modifications can be made thereto without departing from the spirit or scope of the invention. Accordingly, the invention is not limited by the foregoing description, but is only limited by the scope of the claims appended hereto.

What is claimed is:

1. An improved seafloor seismic recorder comprising:
   (a) a chassis having an upper end plate and at least two rigid leg members having top and bottom ends extending downward from said end plate;
   (b) a ballast ring disconnectably connected to said bottom ends of said leg members;
   (c) a control package comprising a housing and electronics means to record seismic signals, power source means, control circuit means, timer means, and compass means therein, said housing having an upper portion and a lower portion and fixedly connected to said chassis between said leg members and below said upper end plate;
   (d) a geophone package disconnectably connected to said lower portion of said housing by a geophone clamp means, and electrically connected to said control package, and tethered to said housing by a tether means that will absorb tension caused by detaching said leg members from said ballast ring, said geophone package comprising at least one geophone that is bias-mounted such that it comes to rest in a nearly horizontal position;
   (e) buoy means attached to said upper end plate to maintain said upper end plate nearly vertically above said base plate when said seafloor recorder is released into a body of water, and to permit said ballast ring and said geophone package to become embedded in sediment on the water bottom upon impact such that sufficient coupling between said geophone package and said sediment is achieved, and to permit said chassis, geophone package, and control package to rise to the surface upon said release of said ballast ring from said leg members; and
   (f) leg extension means, leg clamp means, and leg stop means permitting said leg members to be partially extended to cause said chassis and said control package to rise toward the surface for a short distance, to isolate said geophone package from said housing when detached from said lower portion of said housing yet remain sufficiently coupled to said sediment.

2. The seafloor seismic recorder of claim 1 wherein said geophones are mounted on gimbals so that they remain in said nearly horizontal position.

3. The seafloor seismic recorder of claim 1 wherein said geophone package is filled with a fluid to dampen motion of said geophones, isolate said geophones from external vibrations, and to help prevent damage to said geophones.

4. The seafloor seismic recorder of claim 1 wherein said buoy means is a syntactic foam.

5. The seafloor seismic recorder of claim 1 further comprising a middle support ring fixedly attached to said leg members between said upper end plate and said bottom ends of said leg members.

6. An improved seafloor seismic recorder comprising:
   (a) a chassis having an upper end plate and at least two rigid tubular leg members having top and bottom ends extending downward from said end plate;
   (b) a lower support ring fixedly attached to at least 2 extension legs that extend upward from said lower support ring and disconnectably fit inside said tubular leg members;
   (c) a ballast ring disconnectably connected to said lower support ring;
   (d) a control package comprising a housing and electronics means to record seismic signals, power source means, control circuit means, timer means, and compass means therein, said housing having an upper portion and a lower portion and fixedly connected to said chassis between said leg members and below said upper end plate;
   (e) a geophone package disconnectably connected to said lower portion of said housing by a geophone clamp means, and electrically connected to said control package, and tethered to said housing by a tether means that will absorb tension caused by detaching said leg members from said ballast ring, said geophone package comprising at least one geophone that is bias-mounted such that it comes to rest in a nearly horizontal position;
   (f) buoy means attached to said upper end plate to maintain said upper end plate nearly vertically above said base plate when said seafloor recorder is released into a body of water, and to permit said ballast ring and said geophone package to become embedded in sediment on the water bottom upon impact such that sufficient coupling between said geophone package and said sediment is achieved, and to permit said chassis, geophone package, and control package to rise to the surface upon said release of said ballast ring from said lower support ring; and
   (g) leg clamp means and leg stop means permitting said extension legs to restrictively extend away from said tubular leg members to cause said chassis and said control package to rise toward the surface for a short distance, to isolate said geophone package from said housing when detached from said lower portion of said housing yet remain sufficiently coupled to said sediment.

7. The seafloor seismic recorder of claim 6 wherein said geophones are mounted on gimbals so that they remain in said nearly horizontal position.

8. The seafloor seismic recorder of claim 6 wherein said geophone package is filled with a fluid to dampen motion of said geophones, isolate said geophones from external vibrations, and to help prevent damage to said geophones.

9. The seafloor seismic recorder of claim 6 wherein said buoy means is a syntactic foam.

10. The seafloor seismic recorder of claim 6 further comprising a middle support ring fixedly attached to said leg members between said upper end plate and said bottom ends of said leg members.

11. A method for recording seismic data comprising the steps of:

releasing a seafloor seismic recorder into a body of water at a location to be seismically surveyed, said seafloor seismic recorder further comprising:
(a) a chassis having an upper end plate and at least two rigid leg members having top and bottom ends extending downward from said end plate;
(b) a ballast ring disconnectably connected to said bottom ends of said leg members;
(c) a control package comprising a housing and electronics means to record seismic signals, power source means, control circuit means, timer means, and compass means therein, said housing having an upper portion and a lower portion and fixedly connected to said chassis between said leg members and below said upper end plate;
(d) a geophone package disconnectably connected to said lower portion of said housing by a geophone clamp means, and electrically connected to said control package, and tethered to said housing by a tether means that will absorb tension caused by detaching said leg members from said ballast ring, said geophone package comprising at least one geophone that is bias-mounted such that it comes to rest in a nearly horizontal position;
(e) buoy means attached to said upper end plate to maintain said upper end plate nearly vertically above said base plate when said seafloor recorder is released into a body of water, and to permit said ballast ring and said geophone package to become embedded in sediment on the water bottom upon impact such that sufficient coupling between said geophone package and said sediment is achieved, and to permit said chassis, geophone package, and control package to rise to the surface upon said release of said ballast ring from said leg members;
(f) leg extension means, leg clamp means, and leg stop means permitting said leg members to be partially extended to cause said chassis and said control package to rise toward the surface for a short distance, to isolate said geophone package from said housing when detached from said lower portion of said housing yet remain sufficiently coupled to said sediment;
activating said control circuit means to disconnect said geophone package from said lower portion of said housing; activating said leg extension means, leg clamp means, and leg stop means to partially extend said leg members;
recording said seismic data by activating said control circuit means; and
disconnecting said ballast ring from said bottom ends of said leg members so that said seafloor seismic recorder rises to the surface.

12. The method as recited in claim 11 wherein said geophones are mounted on gimbals so that they remain in said nearly horizontal position.

13. The method as recited in claim 11 wherein said geophone package is filled with a fluid to dampen motion of said geophones, isolate said geophones from external vibrations, and to help prevent damage to said geophones.

14. The method as recited in claim 11 wherein said buoy means is a syntactic foam.

15. The method as recited in claim 11 wherein said seafloor seismic recorder further comprises a middle support ring fixedly attached to said leg members between said upper end plate and said bottom ends of said leg members.

16. A method for recording seismic data comprising the steps of:
releasing said seafloor seismic recorder into a body of water at a location to be seismically surveyed, said seafloor seismic recorder further comprising:
(a) a chassis having an upper end plate and at least two rigid tubular leg members having top and bottom ends extending downward from said end plate;
(b) a lower support ring fixedly attached to at least 2 extension legs that extend upward from said lower support ring and disconnectably fit inside said tubular leg members;
(c) a ballast ring disconnectably connected to said lower support ring;
(d) a control package comprising a housing and electronics means to record seismic signals, power source means, control circuit means, timer means, and compass means therein, said housing having an upper portion and a lower portion and fixedly connected to said chassis between said leg members and below said upper end plate;
(e) a geophone package disconnectably connected to said lower portion of said housing by a geophone clamp means, and electrically connected to said control package, and tethered to said housing by a tether means that will absorb tension caused by detaching said leg members from said ballast ring, said geophone package comprising at least one geophone that is bias-mounted such that it comes to rest in a nearly horizontal position;
(f) buoy means attached to said upper end plate to maintain said upper end plate nearly vertically above said base plate when said seafloor recorder is released into a body of water, and to permit said ballast ring and said geophone package to become embedded in sediment on the water bottom upon impact such that sufficient coupling between said geophone package and said sediment is achieved, and to permit said chassis, geophone package, and control package to rise to the surface upon said release of said ballast ring from said lower support ring;
(g) leg clamp means and leg stop means permitting said extension legs to restrictively extend away from said tubular leg members to cause said chassis and said control package to rise toward the surface for a short distance, to isolate said geophone package from said housing when detached from said lower portion of said housing yet remain sufficiently coupled to said sediment;
activating said control circuit means to disconnect said geophone package from said lower portion of said housing;
activating said leg clamp means, and leg stop means to restrictively extend said extension legs from said tubular leg members;
recording said seismic data by activating said control circuit means; and disconnecting said ballast ring from said lower support ring so that said seafloor seismic recorder rises to the surface.

17. The method as recited in claim 16 wherein said geophones are mounted on gimbals so that they remain in said nearly horizontal position.

18. The method as recited in claim 16 wherein said geophone package is filled with a fluid to dampen motion of said geophones, isolate said geophones from external vibrations, and to help prevent damage to said geophones.

19. The method as recited in claim 16 wherein said buoy means is a syntactic foam.

20. The method as recited in claim 16 wherein said seafloor seismic recorder further comprises a middle support ring fixedly attached to said leg members between said upper end plate and said bottom ends of said leg members.

* * * * *